United States Patent
Smith

(10) Patent No.: US 10,309,846 B2
(45) Date of Patent: Jun. 4, 2019

(54) MAGNETIC FIELD CANCELLATION FOR STRAIN SENSORS

(71) Applicant: Apple Inc., Cupertino, CA (US)

(72) Inventor: John Stephen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 15/658,387

(22) Filed: Jul. 24, 2017

(65) Prior Publication Data

US 2019/0025140 A1 Jan. 24, 2019

(51) Int. Cl.
*G01L 1/22* (2006.01)
*G06F 3/041* (2006.01)

(52) U.S. Cl.
CPC .......... *G01L 1/2268* (2013.01); *G06F 3/0418* (2013.01)

(58) Field of Classification Search
CPC ..... G01L 1/2268; G06F 3/0414; G06F 3/0418
See application file for complete search history.

(56) References Cited

U.S. PATENT DOCUMENTS

| | | | |
|---|---|---|---|
| 3,543,568 A * | 12/1970 | Russell | G01L 1/2268 338/2 |
| 3,745,502 A | 7/1973 | Watanabe | |
| 3,876,912 A | 4/1975 | Sanders | |
| 4,345,477 A | 8/1982 | Johnson | |
| 4,423,640 A | 1/1984 | Jetter | |
| 4,516,112 A | 5/1985 | Chen | |
| 4,634,917 A | 1/1987 | Dvorsky et al. | |
| 4,695,963 A | 9/1987 | Sagisawa | |
| 4,951,510 A | 8/1990 | Holm-Kennedy et al. | |
| 5,481,905 A | 1/1996 | Pratt | |
| 5,577,021 A | 11/1996 | Nakatani et al. | |
| 5,616,846 A | 4/1997 | Kwasnik | |
| 5,673,041 A | 9/1997 | Chatigny et al. | |
| 5,708,460 A | 1/1998 | Young | |
| 5,790,215 A | 8/1998 | Sugahara | |
| 5,915,285 A | 6/1999 | Sommer | |
| 6,288,829 B1 | 9/2001 | Kimura | |
| 6,369,865 B2 | 4/2002 | Hinata | |

(Continued)

FOREIGN PATENT DOCUMENTS

| | | |
|---|---|---|
| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — David J Bolduc
(74) *Attorney, Agent, or Firm* — Brownstein Hyatt Farber Schreck, LLP

(57) ABSTRACT

A strain-responsive sensor incorporating a strain-sensitive element is disclosed. The strain-sensitive element includes a matched-pair of resistive structures disposed on opposite sides of a substrate. One resistive structure is coupled to a crossover, either a physical crossover or a soft crossover, such that current within the resistive structures of the matched pair flows in the same direction. In addition, one resistive structure of the matched pair has a different loop area than the other resistive structure.

15 Claims, 13 Drawing Sheets

(56) References Cited

U.S. PATENT DOCUMENTS

| | | |
|---|---|---|
| 6,386,023 B1 | 4/2002 | Sajna et al. |
| 6,606,087 B1 * | 8/2003 | Tomomatsu .......... G06F 3/0418 178/18.07 |
| 6,637,276 B2 | 10/2003 | Adderton et al. |
| 6,812,161 B2 | 11/2004 | Heremans |
| 6,973,837 B2 | 12/2005 | Barnett |
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,320,253 B2 | 1/2008 | Hanazawa et al. |
| 7,331,245 B2 | 2/2008 | Nishimura |
| 7,392,716 B2 | 7/2008 | Wilner |
| 7,441,467 B2 | 10/2008 | Bloom |
| 7,456,823 B2 | 11/2008 | Poupyrev et al. |
| 7,511,702 B2 | 3/2009 | Hotelling |
| 7,538,760 B2 | 5/2009 | Hotelling et al. |
| 7,707,894 B2 | 5/2010 | Sumigawa |
| 7,724,248 B2 | 5/2010 | Saito |
| 7,726,199 B2 | 6/2010 | Shkel et al. |
| 7,755,616 B2 | 7/2010 | Jung et al. |
| 7,800,592 B2 | 9/2010 | Kerr et al. |
| 7,903,091 B2 | 3/2011 | Lee |
| 7,992,448 B2 | 8/2011 | Shimazu |
| 8,020,456 B2 | 9/2011 | Liu et al. |
| 8,050,876 B2 | 11/2011 | Feen et al. |
| 8,056,421 B2 | 11/2011 | Sumigawa |
| 8,077,154 B2 | 12/2011 | Emig et al. |
| 8,132,468 B2 | 3/2012 | Radivojevic |
| 8,243,225 B2 | 8/2012 | Kai et al. |
| 8,266,971 B1 | 9/2012 | Jones |
| 8,305,358 B2 | 11/2012 | Klighhult et al. |
| 8,421,483 B2 | 4/2013 | Klinghult et al. |
| 8,434,369 B2 | 5/2013 | Hou et al. |
| 8,456,430 B2 | 6/2013 | Oliver et al. |
| 8,482,545 B2 | 7/2013 | King-Smith et al. |
| 8,519,974 B2 | 8/2013 | Berggren |
| 8,531,429 B2 | 9/2013 | Chang |
| 8,605,053 B2 | 12/2013 | Murphy et al. |
| 8,640,549 B2 | 2/2014 | Inamori |
| 8,648,816 B2 | 2/2014 | Homma et al. |
| 8,669,952 B2 | 3/2014 | Hashimura et al. |
| 8,669,962 B2 | 3/2014 | Kuan |
| 8,681,122 B2 | 3/2014 | Pirogov et al. |
| 8,692,646 B2 | 4/2014 | Lee et al. |
| 8,695,433 B2 | 4/2014 | Shimazu |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,870,087 B2 | 10/2014 | Coogan et al. |
| 8,878,803 B2 | 11/2014 | Kimura et al. |
| 8,982,088 B2 | 3/2015 | Kung |
| 8,988,384 B2 | 3/2015 | Krah |
| 9,007,333 B1 | 4/2015 | Wilson |
| 9,057,653 B2 | 4/2015 | Schediwy |
| 9,024,910 B2 | 5/2015 | Stephanou et al. |
| 9,024,918 B2 | 5/2015 | Cok |
| 9,030,427 B2 | 5/2015 | Yasumatsu |
| 9,063,599 B2 | 6/2015 | Yanagi et al. |
| 9,081,460 B2 | 7/2015 | Jeong et al. |
| 9,099,971 B2 | 8/2015 | Lynn et al. |
| 9,110,532 B2 | 8/2015 | Ando et al. |
| 9,110,545 B2 * | 8/2015 | Radivojevic ........ G06F 3/04883 |
| 9,116,569 B2 | 8/2015 | Stacy et al. |
| 9,116,570 B2 | 8/2015 | Lee et al. |
| 9,128,547 B2 | 9/2015 | Kodani et al. |
| 9,134,826 B2 | 9/2015 | Andoh |
| 9,158,407 B2 | 10/2015 | Coulson |
| 9,182,849 B2 | 11/2015 | Huang et al. |
| 9,182,859 B2 | 11/2015 | Coulson et al. |
| 9,200,970 B2 | 12/2015 | Kodani et al. |
| 9,223,162 B2 | 12/2015 | DeForest et al. |
| 9,223,445 B2 | 12/2015 | Sleeman et al. |
| 9,246,486 B2 | 1/2016 | Yang et al. |
| 9,262,002 B2 | 2/2016 | Momeyer et al. |
| 9,262,003 B2 | 2/2016 | Kitchens |
| 9,292,115 B2 | 3/2016 | Kauhanen |
| 9,304,348 B2 | 4/2016 | Jang |
| 9,304,637 B2 * | 4/2016 | Huang .................... G06F 3/044 |
| 9,329,719 B2 | 5/2016 | Molne et al. |
| 9,360,977 B2 | 6/2016 | Aberg |
| 9,367,173 B2 | 6/2016 | Setlak |
| 9,383,848 B2 | 7/2016 | Daghigh |
| 9,406,013 B2 * | 8/2016 | Suwald ................ G07F 7/0873 |
| 9,415,517 B2 * | 8/2016 | Naidu ................. H03K 17/962 |
| 9,417,696 B2 | 8/2016 | DeLuca |
| 9,417,725 B1 | 8/2016 | Watazu et al. |
| 9,454,268 B2 | 9/2016 | Badaye et al. |
| 9,459,734 B2 | 10/2016 | Day |
| 9,466,783 B2 | 10/2016 | Olien et al. |
| 9,477,342 B2 | 10/2016 | Daverman et al. |
| 9,501,167 B2 | 11/2016 | Day |
| 9,507,456 B2 | 11/2016 | Watazu et al. |
| 9,519,378 B2 | 12/2016 | Watazu et al. |
| 9,542,028 B2 | 1/2017 | Filiz et al. |
| 9,557,857 B2 | 1/2017 | Schediwy |
| 9,562,814 B2 | 2/2017 | Kulkarni et al. |
| 9,563,317 B2 | 2/2017 | Sleeman et al. |
| 9,612,170 B2 | 4/2017 | Vosgueritchian et al. |
| 9,632,629 B2 * | 4/2017 | Prendergast ............ G06F 3/044 |
| 9,639,224 B2 | 5/2017 | Lee |
| 9,658,722 B2 | 5/2017 | Schwartz |
| 9,665,197 B2 | 5/2017 | Haffenden et al. |
| 9,665,200 B2 | 5/2017 | Filiz et al. |
| 9,690,408 B1 | 6/2017 | Krah |
| 9,690,413 B2 | 6/2017 | Filiz |
| 9,690,414 B2 | 6/2017 | Kano et al. |
| 9,727,157 B2 * | 8/2017 | Ham ..................... G06F 3/0412 |
| 9,729,730 B2 | 8/2017 | Levesque et al. |
| 9,791,968 B2 | 10/2017 | Yang |
| 9,841,850 B2 | 12/2017 | Schediwy et al. |
| 9,864,450 B2 | 1/2018 | Watazu et al. |
| 9,881,577 B2 | 1/2018 | Wang et al. |
| 9,916,942 B2 | 3/2018 | Shedletsky |
| 10,007,380 B2 | 6/2018 | Yoon et al. |
| 10,032,592 B2 | 7/2018 | Brooks et al. |
| 2002/0041272 A1 * | 4/2002 | Ohashi ................ G06F 3/03545 345/173 |
| 2002/0149571 A1 | 10/2002 | Roberts |
| 2006/0043508 A1 | 3/2006 | Ohta et al. |
| 2007/0008299 A1 * | 1/2007 | Hristov ................ G06F 3/0416 345/173 |
| 2007/0085836 A1 * | 4/2007 | Ely ..................... G06F 3/03545 345/173 |
| 2007/0159561 A1 | 7/2007 | Chien |
| 2008/0165159 A1 | 7/2008 | Soss et al. |
| 2008/0218488 A1 | 9/2008 | Yang et al. |
| 2009/0002199 A1 | 1/2009 | Lainonen et al. |
| 2009/0267902 A1 | 10/2009 | Nambu et al. |
| 2009/0316380 A1 | 12/2009 | Armstrong |
| 2010/0103115 A1 | 4/2010 | Hainzl |
| 2010/0117809 A1 | 5/2010 | Dai et al. |
| 2010/0123686 A1 | 5/2010 | Klinghult et al. |
| 2011/0045285 A1 | 2/2011 | Saiki et al. |
| 2011/0090146 A1 * | 4/2011 | Katsurahira ........ G06F 3/03545 345/156 |
| 2011/0248839 A1 | 10/2011 | Kwok et al. |
| 2011/0261021 A1 | 10/2011 | Modarres et al. |
| 2011/0285660 A1 | 11/2011 | Prabhu et al. |
| 2012/0019448 A1 | 1/2012 | Pitkanen et al. |
| 2012/0038577 A1 | 2/2012 | Brown et al. |
| 2012/0105367 A1 | 5/2012 | Son et al. |
| 2012/0127136 A1 | 5/2012 | Schneider et al. |
| 2012/0154299 A1 | 6/2012 | Hsu et al. |
| 2012/0188198 A1 | 7/2012 | Jeong et al. |
| 2012/0293491 A1 | 11/2012 | Wang et al. |
| 2013/0016073 A1 * | 1/2013 | Lee .................... G06F 3/03545 345/179 |
| 2013/0074988 A1 | 3/2013 | Chou |
| 2013/0082970 A1 | 4/2013 | Frey et al. |
| 2013/0141365 A1 | 6/2013 | Lynn et al. |
| 2013/0147739 A1 | 6/2013 | Aberg et al. |

(56) References Cited

U.S. PATENT DOCUMENTS

| | | |
|---|---|---|
| 2013/0154933 A1 | 6/2013 | Sheik-Nainar |
| 2013/0155059 A1 | 6/2013 | Wang et al. |
| 2013/0215056 A1 | 8/2013 | Johansson et al. |
| 2013/0222306 A1 | 8/2013 | Aberg et al. |
| 2013/0328803 A1 | 12/2013 | Fukushima et al. |
| 2013/0333922 A1 | 12/2013 | Kai et al. |
| 2014/0002113 A1* | 1/2014 | Schediwy ............... G06F 3/044 324/661 |
| 2014/0085253 A1 | 3/2014 | Leung et al. |
| 2014/0118241 A1* | 5/2014 | Chai ..................... G06F 3/0418 345/156 |
| 2014/0118635 A1 | 5/2014 | Yang |
| 2014/0191973 A1 | 7/2014 | Zellers et al. |
| 2014/0327847 A1 | 11/2014 | Park et al. |
| 2015/0002452 A1 | 1/2015 | Klinghult |
| 2015/0082901 A1* | 3/2015 | Fuji ........................ H04R 19/04 73/779 |
| 2015/0082917 A1* | 3/2015 | Fuji ........................... G01L 9/16 73/862.69 |
| 2015/0101849 A1 | 4/2015 | Bockmeyer et al. |
| 2015/0102806 A1* | 4/2015 | Tsuchihashi ............ G06F 3/046 324/207.17 |
| 2015/0116260 A1 | 4/2015 | Hoen et al. |
| 2015/0242037 A1 | 8/2015 | Pedder et al. |
| 2015/0268725 A1 | 9/2015 | Levesque et al. |
| 2015/0301684 A1 | 10/2015 | Shimamura |
| 2015/0331517 A1 | 11/2015 | Filiz et al. |
| 2015/0370412 A1* | 12/2015 | Ohba .................... G06F 3/0418 345/174 |
| 2016/0003697 A1 | 1/2016 | Okamoto et al. |
| 2016/0011708 A1* | 1/2016 | Chung ................... G06F 3/0414 345/174 |
| 2016/0033389 A1 | 2/2016 | Serpe |
| 2016/0034073 A1 | 2/2016 | Andoh |
| 2016/0035290 A1 | 2/2016 | Kim et al. |
| 2016/0041672 A1 | 2/2016 | Hoen et al. |
| 2016/0048266 A1 | 2/2016 | Smith et al. |
| 2016/0062517 A1 | 3/2016 | Meyer et al. |
| 2016/0077649 A1 | 3/2016 | Ando et al. |
| 2016/0117035 A1 | 4/2016 | Watazu et al. |
| 2016/0132151 A1 | 5/2016 | Watazu et al. |
| 2016/0147353 A1 | 5/2016 | Filiz et al. |
| 2016/0224086 A1* | 8/2016 | Kim ......................... G06F 3/044 |
| 2016/0259411 A1* | 9/2016 | Yoneoka ................. G06F 3/016 |
| 2016/0306481 A1 | 10/2016 | Filiz et al. |
| 2016/0357297 A1 | 12/2016 | Picciotto et al. |
| 2017/0031495 A1 | 2/2017 | Smith |
| 2017/0068318 A1* | 3/2017 | McClure ................. G06F 3/016 |
| 2017/0075465 A1 | 3/2017 | Pedder et al. |
| 2017/0083150 A1* | 3/2017 | Mishra ..................... G06F 3/044 |
| 2017/0090638 A1 | 3/2017 | Vosgueritchian et al. |
| 2017/0090655 A1 | 3/2017 | Zhang et al. |
| 2017/0191884 A1 | 7/2017 | Vosgueritchian et al. |
| 2017/0261387 A1 | 9/2017 | Vosgueritchian et al. |
| 2017/0285799 A1 | 10/2017 | Iuchi et al. |
| 2017/0285864 A1 | 10/2017 | Pedder et al. |
| 2017/0336902 A1* | 11/2017 | Smith .................... G06F 3/0416 |
| 2018/0059839 A1 | 3/2018 | Kim et al. |
| 2018/0067612 A1 | 3/2018 | Smith |
| 2018/0074638 A1 | 3/2018 | Chiang et al. |
| 2018/0157363 A1 | 6/2018 | Vosgueritchian et al. |
| 2018/0217708 A1 | 8/2018 | Hoen et al. |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102165400 | 8/2011 |
| CN | 102175362 A | 9/2011 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 204461655 U | 7/2015 |
| CN | 104866134 | 8/2015 |
| CN | 204576454 U | 8/2015 |
| CN | 105444662 | 3/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," Sensor+Test Conferences 2011—SENSOR Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

\* cited by examiner

MAGNETIC FIELD CANCELLATION FOR STRAIN SENSORS

FIELD

Embodiments described herein generally relate to strain-responsive sensors and, more particularly, to systems and methods for avoiding interference caused by changing magnetic fields in matched-pair resistive sensors.

BACKGROUND

An electronic device can include an input surface to receive a force input from a user. A sensor coupled to the input surface can be configured to generate a signal corresponding to a deformation of the input surface that results from the force input. The signal can be used by the electronic device to determine an operation to perform in response to the force input.

The performance of the sensor may be affected by the precision with which the deformation of the input surface is detected. In many cases, the sensor includes a strain-sensitive element coupled to the input surface to measure strain experienced by the input surface as a result of the deformation. However, in some cases, a measurement obtained from the strain-sensitive element is affected by interference caused by changing magnetic fields, which may originate at components such as speakers, haptic feedback elements, inductive power transfer interfaces, microphones, styluses, and so on.

SUMMARY

Embodiments described herein reference a strain-responsive sensor including at least a strain-sensitive element. The strain-sensitive element includes a matched pair of resistive structures coupled to opposite sides of a substrate. Current through the resistive structures may flow in opposite directions to cancel magnetic interference. Some strain-sensitive elements are adjacent a magnetic interference source, which may create a magnetic field that varies between the matched pair of resistive structures of the strain-sensitive elements. The loop area of one resistive structure may differ from the other resistive structure in order to compensate for the effects of the magnetic interference source.

In one aspect, an electronic device includes an enclosure housing a display. A cover sheet positioned over the display forms an external surface of the electronic device. A magnetic interference source is positioned within the enclosure. A strain-sensing layer is beneath the cover sheet. The strain-sensing layer includes a substrate, a first strain-sensing element, and a second strain-sensing element. The first strain-sensing element includes a first upper resistive structure is coupled to an upper surface of the substrate and has a first set of conductive traces. A first lower resistive structure is coupled to a lower surface of the substrate and has a second set of conductive traces aligned with the first set of conductive traces.

The second strain-sensing element is positioned adjacent the magnetic interference source. The second strain-sensing element includes a second upper resistive structure is coupled to the upper surface of the substrate and has a third set of conductive traces. A second lower resistive structure is coupled to the lower surface of the substrate and has a fourth set of conductive traces. At least a portion of the fourth set of conductive traces does not align with the third set of conductive traces.

In some examples, a first central conductive trace of the third set of conductive traces is not aligned with a second conductive trace of the fourth set of conductive traces. The remaining traces of the third set of conductive traces are aligned with the remaining traces of the fourth set of conductive traces.

In another aspect, a strain-response sensor includes a substrate and a strain-sensitive element. The strain-sensitive element includes a first resistive structure coupled to a first surface of the substrate and has a first set of conductive traces. A second resistive structure substantially aligns with the first resistive structure, is coupled to the second surface of the substrate.

The second resistive structure includes a second set of conductive traces, and at least a portion of the first set of conductive traces does not align with the second set of conductive traces. A crossover couples the first resistive structure to the second resistive structure such that current flows within the second resistive structure in the same direction as the first resistive structure.

In some examples, the first resistive structure is formed from at least one of indium tin oxide, copper-nickel alloy, copper-nickel-iron alloy, copper-nickel-manganese-iron alloy, copper-nickel-manganese alloy, chrome-nickel alloy, chromium nitride, composite nanowire structures, composite carbon structures, graphene, nanotubes, Constantan, Karma alloy, or isoelastic alloy. The second resistive structure may have the same shape as the first resistive structure.

In another aspect, a method of operating a strain-responsive sensor includes applying a first voltage of a first polarity to a first resistive structure of the strain-responsive sensor. A second voltage of the first polarity is applied to a second resistive structure of the strain-responsive sensor such that current flows through the second resistive structure in the same direction as through the first resistive structure. The second resistive structure is separated from the first resistive structure by a substrate and has at least one conductive trace not aligned with a corresponding conductive trace of the first resistive structure. The method includes measuring an output voltage of a balancing network electrically coupled to the first resistive structure and the second resistive structure. The measured output voltage is associated with an amount of strain experienced by one or both of the first resistive structure and the second resistive structure.

BRIEF DESCRIPTION OF THE DRAWINGS

The disclosure will be readily understood by the following detailed description in conjunction with the accompanying drawings, wherein like reference numerals designate like elements.

Figure 1:
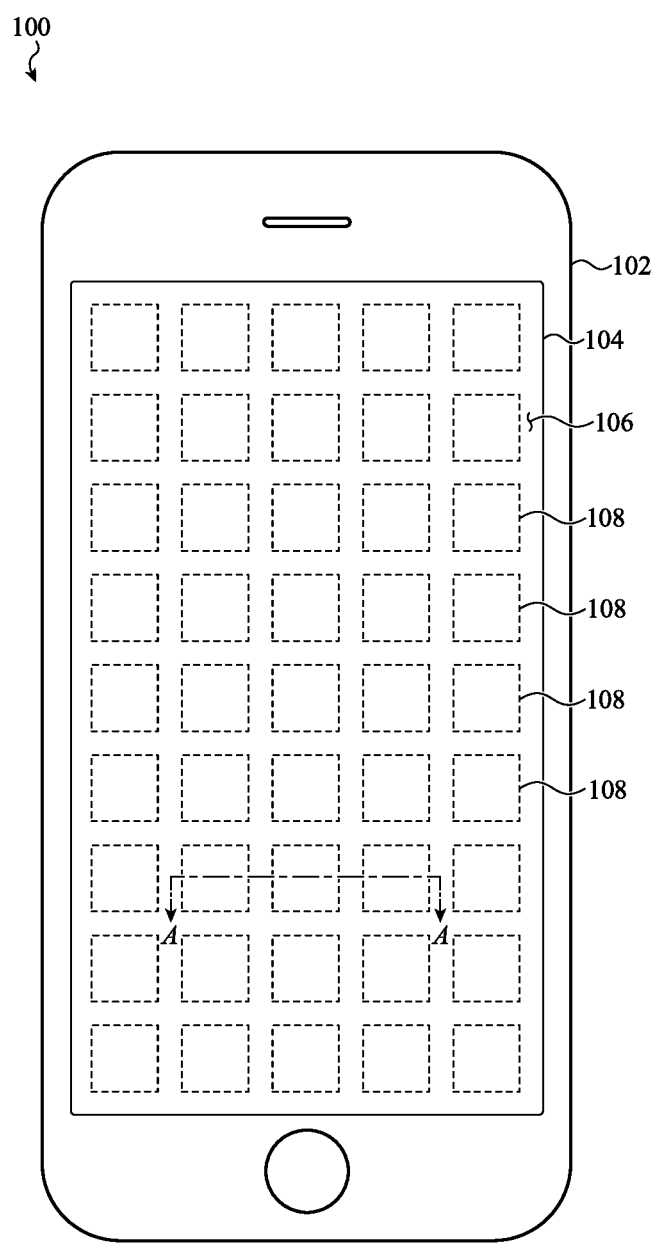
FIG. 1 depicts an electronic device with an input surface configured to receive force input from a user.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiments described herein reference an electronic device that registers non-binary force input from a user, and generates a corresponding non-binary force input signal. A "non-binary" force input signal is one that may be registered as more than two possible values. Put another way, non-binary force input signals may have intermediate values, outputs, or states other than zero and a maximum (or off and on). Such non-binary signals may have a series of values, which may be discrete or continuous, each corresponding to a variety of input forces beyond binary options.

The electronic device can perform an operation based on characteristics of the force input such as, but not limited to: presence or absence of the force input, a magnitude of the force input, a rate of change of the magnitude of the force input, a location of one or more focal points of the force input, a change in a location of one or more focal points of the force input, a duration of the force input, and so on. The electronic device can perform the operation at any suitable time during or after the force input is applied by the user.

Example electronic devices include, but are not limited to: portable electronic devices, fixed electronic devices, cellular telephones, tablet computing devices, wearable computing devices, peripheral input devices, industrial or equipment control devices, transportation devices, navigation devices, medical devices, health devices, and so on.

In many embodiments, the electronic device includes a strain-responsive sensor. The strain-responsive sensor is coupled, either directly or indirectly, to an input surface of the electronic device. The input surface defines an external surface of the electronic device and is configured to receive the force input from the user. In some cases, the input surface is a protective outer layer of a display. The strain-responsive sensor typically includes a strain-sensitive element and an electrical circuit.

The strain-sensitive element of the strain-responsive sensor is configured to experience compression or tension when the input surface flexes in response to the force input. The strain-sensitive element can abut, or can be coupled to, the input surface or another element or layer adjacent to the input surface. The strain-sensitive element can be formed, at least in part, from a material that exhibits an electrical resistance that changes as a function of strain such as, but not limited to, a piezoresistive material.

The electrical circuit of the strain-responsive sensor is configured to measure the electrical resistance of the strain-sensitive element, either directly or indirectly. A measured resistance can be correlated to a magnitude of strain experienced by the input surface which, in turn, can be correlated to a magnitude of the force input applied by the user.

In many cases, the strain-sensitive element is implemented with a number of independent resistive structures each formed from the same material and formed generally in the same pattern. This configuration can be used to mitigate or eliminate noise introduced as a result of unpredictable environmental conditions, such as changes in temperature.

For example, a typical configuration of the strain-sensitive element includes a matched-pair of two resistive structures, one disposed on each side of a single layer or stratiform substrate. The resistive structures are formed with the same material and are disposed in the same pattern and arranged and aligned so as to mirror one another. That is, the resistive structures align along an axis passing perpendicular through the substrate on which they are disposed. Generally and broadly, the two resistive structures of a strain-sensitive element are referred to herein as an "upper" resistive structure and a "lower" resistive structure. In the aligned and mirrored configuration, environmental conditions affect the upper resistive structure and the lower resistive structure in substantially the same manner such that any noise introduced by these conditions can be canceled using a suitable measurement technique, such as a differential measurement technique.

In many embodiments, the upper and lower resistive structures can take a generally-looped shape, such as a spiral shape. This configuration can increase the sensitivity of the strain-responsive sensor by increasing a dimension of the resistive structure that can be strained. Other shapes include, but are not limited to: linear serpentine shapes, radial serpentine shapes, doubled-back spiral shapes, and so on.

In many cases, changing magnetic fields can induce a measurable electromotive force within the resistive structures. The induced electromotive force may be more pronounced in resistive structures taking a generally-looped shape, such as those described above. In certain configurations, the induced electromotive force can introduce noise as a voltage that can affect the accuracy and/or precision of the strain-responsive sensor.

In particular, some resistive structures may be coupled in a circuit that can be modeled from certain frames of reference as an open loop. More specifically, certain configurations can be modeled as an open loop from a frame of reference generally normal to the plane of the substrate (e.g., top-down view of the stacked and aligned resistive structures). In these configurations, current flows through an upper resistive structure in one direction and through a lower resistive structure in the opposite direction. In other words, the current path through the lower resistive structure doubles back upon the current path through the upper resistive structure. By Lenz's law, a changing magnetic field (e.g., varying magnetic flux) generally normal to the plane of the substrate would induce an electromotive force within the open loop to oppose that magnetic field. However, because the loop is open, the electromotive force induces a voltage. This voltage can interfere with the operation of the strain-responsive sensor, especially for implementations in which the resistive structures of a strain-sensitive element are configured in a voltage-divider or balancing network configuration.

Accordingly, to offset the potential effects of changing magnetic fields, the resistive structures of embodiments described herein are coupled to one another in a circuit such that current flows in the same direction through each structure. This configuration can be modeled as a closed loop from a frame of reference generally normal to the plane of the substrate. In these configurations, current flows through the upper resistive structure and the lower resistive structure in the same direction. In other words, the current path through the lower resistive structure continues upon the current path through the upper resistive structure. By Lenz's law, a changing magnetic field (e.g., varying magnetic flux) generally normal to the plane of the substrate would induce an electromotive force within the closed loop to oppose that magnetic field. Because the loop is closed, the electromotive force induces a current. Such a current does not interfere with the operation of the strain-responsive sensor in which the resistive structures of a strain-sensitive element are configured in a voltage-divider or balancing network configuration. More specifically, a voltage-divider or balancing network configuration is substantially unaffected by the induced current because the induced current effects the upper resistive structure and the lower resistive structure in substantially the same manner (e.g., induced current does not result in significant voltage change at measurement node(s) of the voltage-divider or balancing network).

In some cases, a changing magnetic field may be induced by a known magnetic interference source near to a strain-responsive sensor. Due to the proximity of the interference source to the strain-responsive sensor, the distance separating the two resistive structures across a substrate may result in each resistive structure experiencing a slightly different magnetic field. The difference between the magnetic fields experienced at each resistive structure may induce an electromotive force within the strain-responsive sensor which may not be fully compensated for by the closed loop configuration.

In order to compensate for the effects of the differing magnetic fields from a nearby interference source, the two resistive structures may not be total mirrors of one another. For example, the area of each loop may be slightly changed in one resistive structure by moving one or more trace lines of the resistive structure. In other examples, the resistive structures may be slightly offset in order to adjust the magnetic flux experienced by the resistive structures to be even.

In many embodiments, a strain-responsive sensor may include an array (or group) of strain-sensitive elements, each implemented with a matched-pair of resistive structures coupled to one another in a circuit such that current flows in the same direction through each structure. Strain-sensitive elements which are near known magnetic interference sources (e.g., a speaker, microphone, haptic feedback element, and so on) may be implemented with a pair of resistive structures in which one has a slightly different loop area than the other.

These and other embodiments are discussed below with reference to FIGS. 1-10. However, those skilled in the art will readily appreciate that the detailed description given herein with respect to these figures is for explanatory purposes only and should not be construed as limiting.

FIG. 1 depicts an electronic device 100 that can include a strain-responsive sensor with a strain-sensitive element such as described herein. More generally, a strain-responsive sensor may be generally referred to as an "input sensor."

The electronic device 100 includes a housing 102 to retain, support, and/or enclose various components of the electronic device 100, such as a display 104. The display 104 may be any suitable display element. For example, the display 104 may include a stack of multiple layers including, for example, and in no particular order: a display layer (e.g., a light-emitting diode layer), a cover layer, a touch input layer, and so on. Other embodiments can implement the display 104 in a different manner, such as with liquid crystal display technology, electronic ink technology, quantum dot technology, and so on. In many embodiments, a protective outer layer of the display 104 defines an input surface 106.

The various layers of the display 104, regardless of the implementation-specific display technology selected for a particular embodiment, may be adhered together with an optically transparent adhesive and/or may be supported by a common frame such that the layers abut one another. A common frame may extend around a perimeter, or a portion of the perimeter, of the layers, may be segmented around the perimeter, a portion of the perimeter, or may be coupled to the various layer of the display 104 in another manner.

The common frame can be made from any suitable material such as, but not limited to: metal, plastic, ceramic, acrylic, and so on. The common frame, in some embodiments, may be a multi-purpose component serving an additional function such as, but not limited to: providing an environmental and/or hermetic seal to one or more components of the display 104 or the electronic device 100; providing structural support to the housing 102; providing pressure relief to one or more components of the display 104 or the electronic device 100; providing and defining gaps between one or more layers of the display 104 for thermal venting and/or to permit flexing of the layers in response to a force applied to the input surface 106; and so on.

In some embodiments, the layers of the display 104 may be attached or deposited onto separate substrates that may be laminated or bonded to each other. The display 104 may also include or be positioned adjacent to other layers suitable for improving the structural or optical performance of the display 104, including, but not limited to, a cover glass sheet, polarizer sheets, color masks, and the like. Additionally, the display 104 may include a touch sensor for determining the location of one or more touches on the input surface 106 of the electronic device 100. In many examples, the touch sensor is a capacitive touch sensor configured to detect the location and/or area of one or more touches of a user's finger and/or a passive or active stylus on the input surface 106. An example cross-section of the layers of the display 104 is depicted with respect to FIG. 2.

The electronic device 100 can also include a processor, memory, power supply and/or battery, network connections, sensors, input/output ports, acoustic elements, haptic elements, digital and/or analog circuits for performing and/or coordinating tasks of the electronic device 100, and so on. For simplicity of illustration, the electronic device 100 is depicted in FIG. 1 without many of these elements, each of which may be included, partially and/or entirely, within the housing 102 and may be operationally or functionally associated with or coupled to the display 104.

Furthermore, although illustrated as a cellular phone, the electronic device 100 can be another electronic device that is either stationary or portable, taking a larger or smaller form factor than illustrated. For example, in certain embodiments, the electronic device 100 can be a laptop computer, a tablet computer, a cellular phone, a wearable device, a health monitoring device, a home or building automation device, a home or building appliance, a craft or vehicle entertainment, control, and/or information system, a navigation device, and so on.

As noted above, the electronic device 100 can also include a strain-responsive sensor coupled to the display 104. The strain-responsive sensor can include an array of strain-sensitive elements 108 distributed in a pattern below the input surface 106. For simplicity of illustration, FIG. 1 is depicted without the strain-responsive sensor which may be included, partially and/or entirely, within the housing 102.

Figure 2:
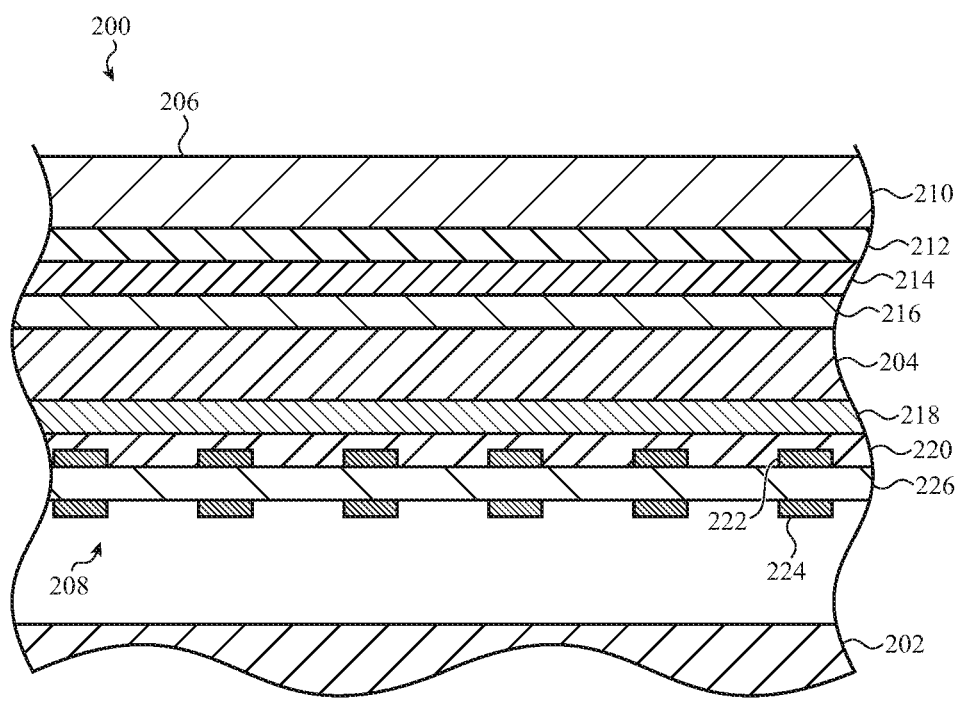
FIG. 2 depicts a cross-section of the electronic device, taken along line A-A of FIG. 1.

FIG. 2 depicts a simplified cross-sectional view of an electronic device 200 having an array of strain-sensitive elements 208 positioned between a transparent cover layer 210 and a housing 202. In some embodiments, each strain-sensitive element 208 includes a matched-pair of resistive structures 222, 224 coupled to a substrate layer 226. Each strain-sensitive element 208 can be a portion of a strain-responsive sensor used by the electronic device 200 to gather pressure or force input from a user of the electronic device 200.

Specifically, a strain-sensitive element 208 includes an upper structure 222 and a lower structure 224, which may be resistive structures. Each of the upper structure 222 and the lower structure 224 is formed from a strain-sensitive material, such as a piezoresistive, piezoelectric, or similar material having an electrical property that changes in response to stress, strain, and/or deflection. The upper structure 222 and lower structure 224 are further described below with respect to FIGS. 4A-4C.

Figure 10:
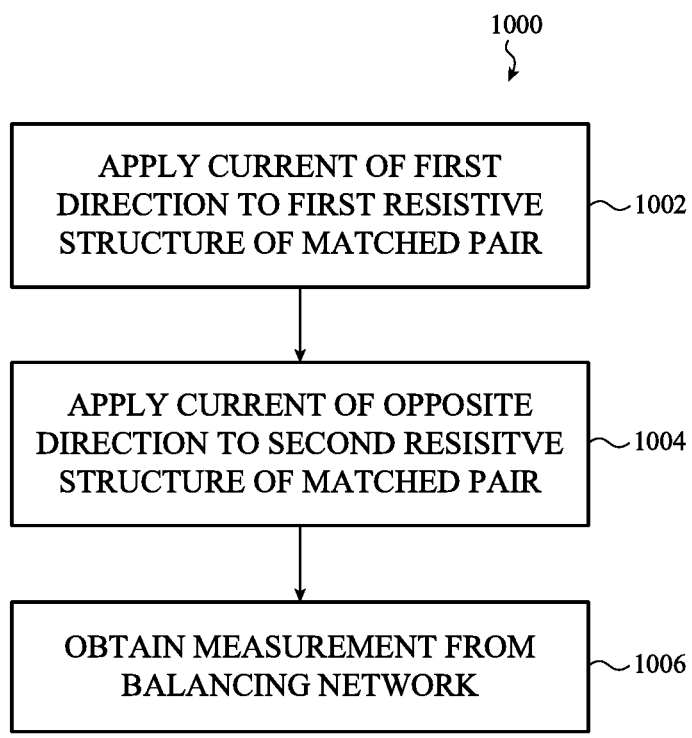
FIG. 10 depicts example operations of a method of operating a strain-responsive sensor in a manner that avoids magnetic interference.

The upper structure 222 and lower structure 224 may be electrically coupled to sensing circuitry, as depicted in FIGS. 3A-3D. The sensing circuitry may detect, measure, and/or estimate a force applied to the input surface 206 in a manner such as depicted in FIG. 10. The sensing circuitry may additionally determine both the location and the force applied to the input surface 206.

Figure 5:
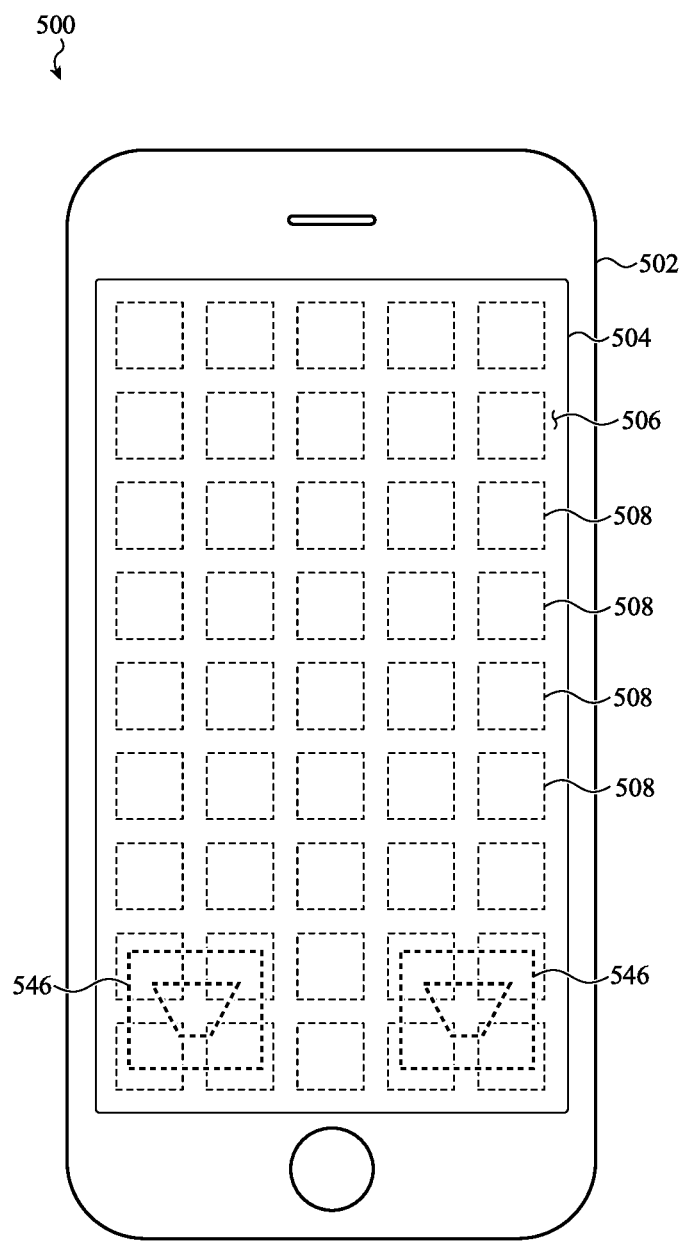
FIG. 5 an electronic device with a force sensing layer positioned over magnetic interference sources.
Figure 6:
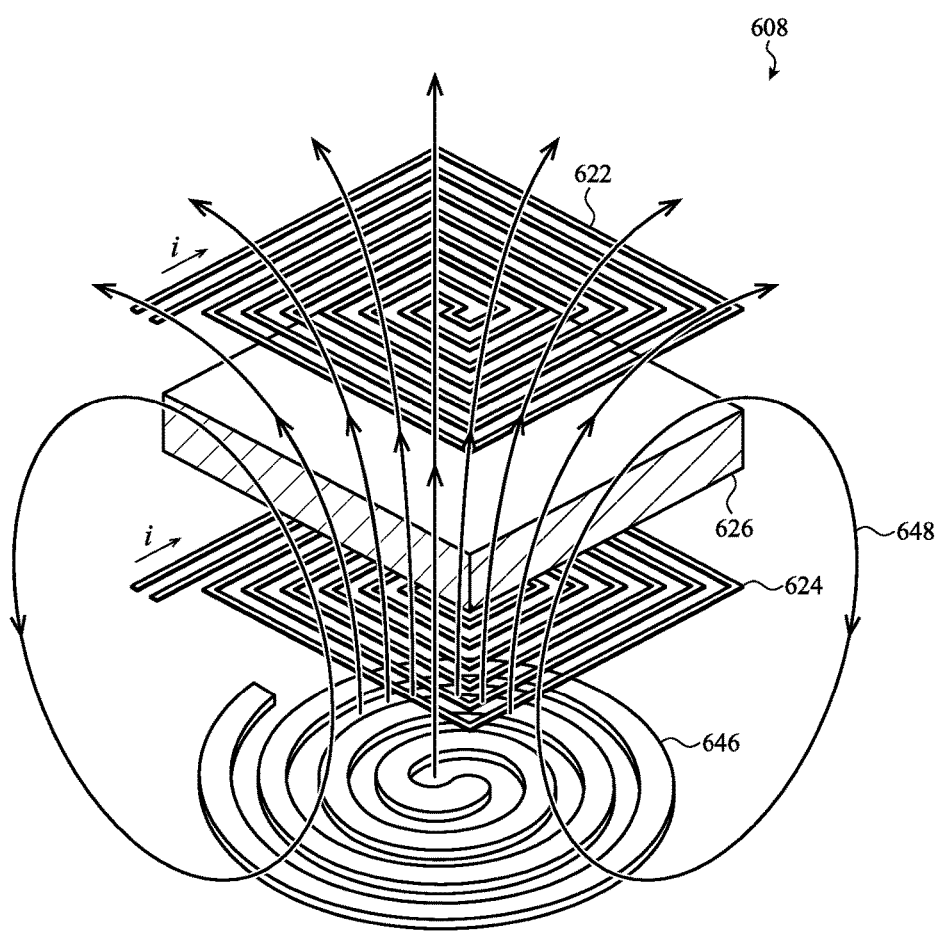
FIG. 6 depicts a strain-responsive sensor including a cross-section of a strain-responsive element positioned over a magnetic interference source.
Figure 7A:
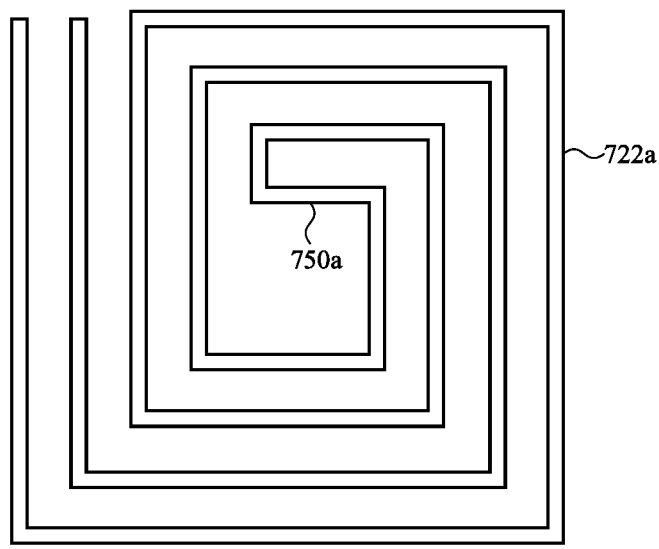
FIG. 7A depicts a first example resistive structure having a first loop area.

In some embodiments, some of the strain-sensitive elements 208 may be positioned adjacent a magnetic interference source, such as a microphone or speaker, as depicted in FIGS. 5 and 6. The proximity of the magnetic interference source may cause distinct magnetic field effects to be experienced by the upper structure 222 and lower structure 224. To compensate for this, the upper structure 222 may have a different loop area from the lower structure 224, as depicted in FIGS. 7A-8.

The substrate layer 226 between the upper structure 222 and the lower structure 224 may include materials such as, but not limited to: plastic, foam, metal, ceramic, glass, polyimide, polyethylene terephthalate, sapphire, polyimide, cyclo-olefin polymer, or any combination thereof. The material of the upper structure 222 and lower structure 224 may be formed or deposited on the substrate layer 226 using a suitable disposition technique such as, but not limited to: vapor deposition, sputtering, printing, roll-to-roll processing, gravure, pick and place, adhesive, mask-and-etch, and so on.

In some cases, the upper structure 222 and lower structure 224 are formed in two stages of the same manufacturing process. In some cases, the upper structure 222 and lower structure 224 are formed simultaneously onto the substrate layer 226. In other cases, an array of upper structures 222 may be formed on a film or other material, while an array of lower structures 224 are formed on another film or other material, and the two arrays may be coupled to the substrate layer 226.

In many embodiments, the force-sensitive structure 308*b* may be disposed in an optically opaque layer (e.g., below a display 224). In these embodiments, the material of the upper structure 222, the lower structure 224, and the substrate layer 226 may be formed from non-transparent materials. In other embodiments, it may be preferable for the conductive material and substrate layer to be made from optically transparent materials (e.g., where the strain-sensitive elements 208 are above the display 204).

Figures 9A, 9B:
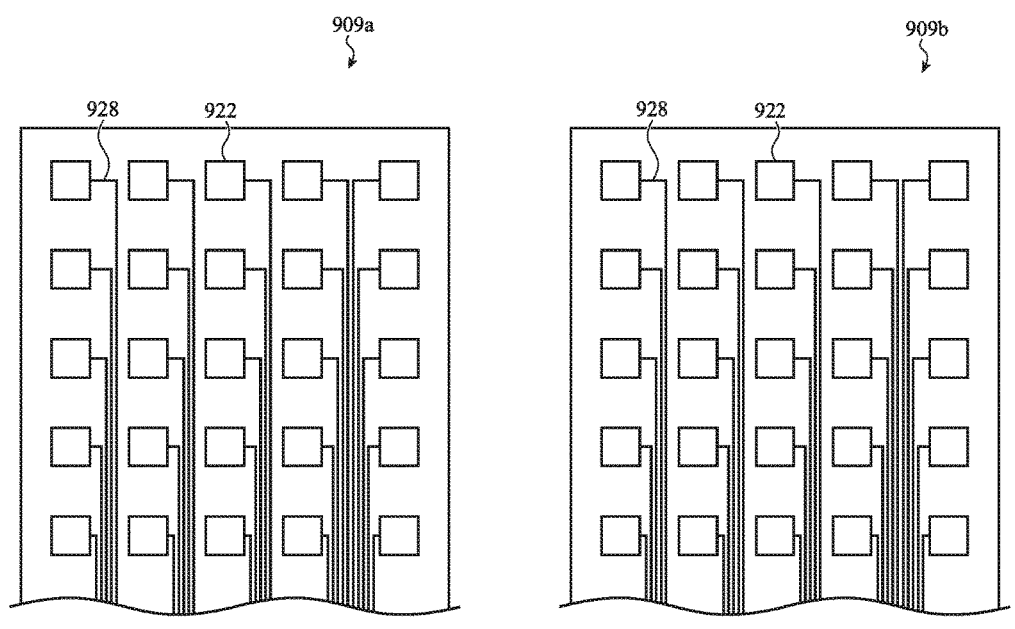
FIG. 9A depicts an example of a top array of resistive structures.
FIG. 9B depicts an example of a bottom array of resistive structures.

An array of upper structures 222 may be formed on the substrate layer 226 with traces of conducting material (e.g., leads) for coupling to sensing circuitry, such as depicted in FIG. 9A. An array of lower structures 224 may be formed on the substrate layer 226 with traces of conducting material for coupling to sensing circuitry, such as depicted in FIG. 9B. The sensing circuitry to which the arrays of resistive structures 222, 224 are coupled may detect differential measurements between matched pairs of an upper structure 222 and a lower structure 224.

The array of strain-sensitive elements 208 is mechanically coupled to the transparent cover layer 210 such that a force applied to the input surface 206 is transferred to the strain-sensitive elements 208. In many embodiments, the array of strain-sensitive elements 208 is coupled to the transparent cover layer 210 through one or more intermediate layers, such as a display stack. For example, the array of strain-sensitive elements 208 may be coupled below a display stack, which may include one or more layers of material bonded together with optically clear adhesives.

The display stack can include a transparent cover layer 210 and a display layer 204 positioned below the transparent cover layer 210. The display layer 204 may be a pixelated display configured to display programmable images and graphic displays. The display layer 204 may include an organic light emitting diode display formed from two layers: an encapsulation layer and a phosphorescent organic layer. The display may additionally or alternatively include one of a variety of other types of display elements including, for example, a liquid crystal display, a light emitting diode display, an electroluminescent display, an electrophoretic ink display, and the like.

A touch sensor layer 214 may be positioned between the display layer 204 and the transparent cover layer 210. The touch sensor layer 214 may include an array of touch sensors or proximity sensors that are configured to detect the location of a finger or object on or near the transparent cover layer 210. The touch or proximity sensors may operate in accordance with a number of different sensing schemes. In some implementations, the touch or proximity sensors may operate in accordance with a mutual-capacitance sensing scheme. Under this scheme, the touch sensor layer 214 may include two layers of intersecting transparent traces (e.g., sensing nodes) that are configured to detect the location of a touch by monitoring a change in capacitive or charge coupling between pairs of intersecting traces. In another implementation, the touch sensor layer 214 may operate in accordance with a self-capacitive sensing scheme. Under this scheme, the touch sensor layer 214 may include an array of capacitive electrodes or pads (e.g., sensing nodes) that are configured to detect the location of a touch by monitoring a change in self-capacitance of a small field generated by each electrode. In other implementations, a resistive, inductive, or other sensing scheme could also be used.

The sensing nodes may be formed by depositing or otherwise fixing a transparent conductive material to a substrate material. Potential substrate materials include, for example, glass or transparent polymers like polyethylene terephthalate or cyclo-olefin polymer. Example transparent conductive materials include polyethyleneioxythiophene, indium tin oxide, carbon nanotubes, graphene, piezoresistive semiconductor materials, piezoresistive metal materials, silver nanowire, other metallic nanowires, and the like. The transparent conductors may be applied as a film or may be patterned into an array on the surface of the substrate using a suitable disposition technique such as, but not limited to: vapor deposition, sputtering, printing, roll-to-roll processing, gravure, pick and place, adhesive, mask-and-etch, and so on.

The sensing nodes of the touch sensor layer 214 may be operably coupled to touch sensing circuitry to form touch or proximity sensors. The touch sensing circuitry may be configured to detect and estimate the location of a touch on or near the adaptive input surface 204. The touch sensing circuitry may further output signals or other indicia indicating the detected location of a touch. The touch sensing circuitry may be operably coupled to a processing unit, and in some embodiments may be integrated with a processing unit.

An adhesive layer 212 may couple the touch sensor layer 214 to the transparent cover layer 210. An additional adhesive layer 216 may couple the display layer 204 to the touch sensor layer 214. The adhesive layers 212, 216 may be an appropriate adhesive, such as a liquid optically clear adhesive.

The array of strain-sensitive elements 208 may be coupled to the display layer 204 by an adhesive 220, such as a pressure-sensitive adhesive. In some embodiments, a shield layer 218 may be positioned between the display layer 204 and the array of strain-sensitive elements 208. The shield layer 218 may function as an electromagnetic shield to reduce electromagnetic interference from propagating between the display stack and the strain-sensitive elements 208. The shield layer 218 may be formed from an appropriate material, such as copper, aluminum, steel, gold, and so on.

The above description has been discussed with reference to an exemplary arrangement of various stacked layers of an electronic device 200. However, the relative position of the various layers described above may change depending on the embodiment. For example, the array of strain-sensitive elements 208 are discussed as being opaque and positioned below the display layer 204. In other embodiments, the strain-sensitive elements 208 may be transparent and positioned above the display layer 204. Some layers, such as the touch sensor layer 210 and the shield layer 218, may be omitted in other embodiments. The electronic device 200a may include additional layers and components within the enclosure 202, such as control circuitry, a processing unit, a battery, etc., which have been omitted from FIGS. 2A and 2B for clarity.

Figure 3A:
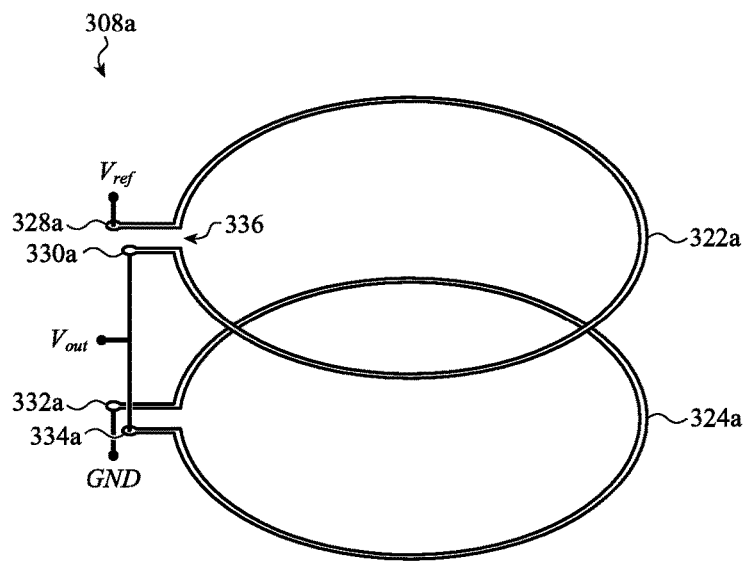
FIG. 3A depicts a simplified strain-sensitive element including a matched-pair of resistive structures coupled into a voltage-divider configuration that can be modeled as an open loop, particularly an open loop having two leads across which a changing magnetic field induces an electromotive force as a voltage.
Figure 3B:
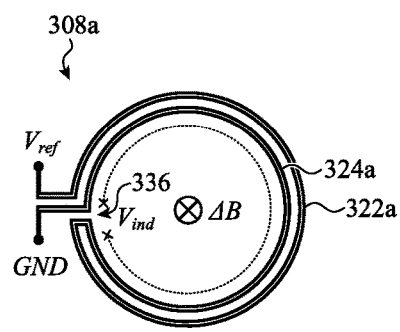
FIG. 3B depicts a top-down view of the strain-sensitive element of FIG. 2A.
Figure 3C:
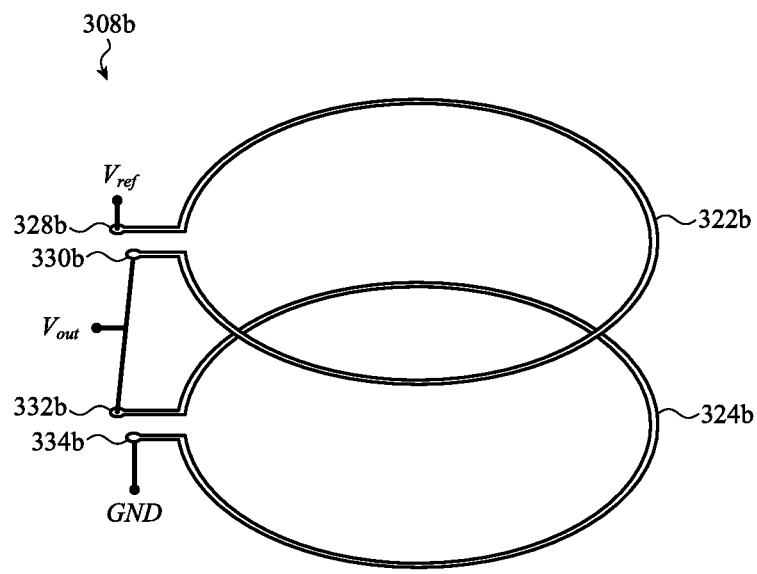
FIG. 3C depicts a simplified strain-sensitive element including a matched-pair of resistive structures coupled into a voltage-divider configuration that can be modeled as a closed loop, particularly a closed loop through which a changing magnetic field induces a current.
Figure 3D:
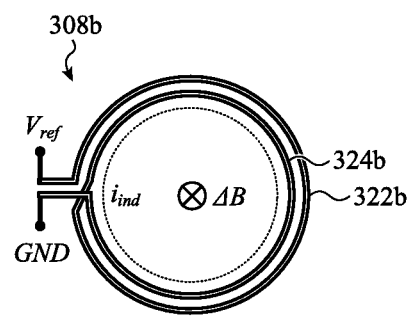
FIG. 3D depicts a top-down view of the strain-sensitive element of FIG. 2B.

Generally and broadly, FIGS. 3A-3D depict a simplified model of a strain-responsive sensor that includes a strain-sensitive element 308a, 308b defined by a matched-pair of resistive structures 322a, 324a electrically coupled into a voltage divider configuration. In many embodiments, the voltage divider can be coupled to a balancing network (not shown) to form a Wheatstone bridge. The strain-sensitive element 308a, 308b can be a portion of a strain-responsive sensor used by an electronic device, such as the electronic device 100 in FIG. 1, to gather pressure or force input from a user of the electronic device. Generally, FIGS. 3A-3B depict a configuration of the strain-sensitive element 308a that can be modeled as an open loop and FIGS. 3C-3D depict a configuration of the strain-sensitive element 308b that can be modeled as a closed loop.

Specifically, FIG. 3A depicts a simplified model of a strain-sensitive element 308a. The strain-sensitive element 308a includes an upper structure 322a and a lower structure 324a. In many embodiments, the upper structure 322a and the lower structure 324a are resistive structures. The upper structure 322a has a first lead 328a and a second lead 330a. Similarly, the lower structure has a first lead 332a and a second lead 334a. In the illustrated embodiment, the second lead 330a of the upper structure 322a is coupled to the second lead 334a of the lower structure 324a.

In this configuration, a reference voltage $V_{ref}$ (or voltage signal) can be applied across the first lead 328a of the upper structure 322a and the first lead 332a of the lower structure 324a. A voltage $V_{out}$ can be measured between the second lead 330a of the upper structure 322a and the second lead 334a of the lower structure 324a.

FIG. 3B depicts a top-down view of the strain-sensitive element 308a of FIG. 3A. As a result of the configuration depicted, the strain-sensitive element 308a can be modeled as an open loop having a break 336. As a result of the break 336, a changing magnetic field ΔB induces a voltage $V_{ind}$ that may be summed with the output voltage $V_{out}$. As noted above, this configuration may result in undesirable noise corresponding to the magnitude of the induced voltage $V_{ind}$.

Many embodiments described herein are configured differently than the embodiment depicted in FIGS. 3A-3B. For example, FIG. 3C depicts another simplified model of a strain-sensitive element 308b. As with the embodiment depicted in FIG.3A, the strain-sensitive element 308b includes an upper structure 322b and a lower structure 324b. In many embodiments, the upper structure 322b and the lower structure 324b are resistive structures. The upper structure 322b has a first lead 328b and a second lead 330b. Similarly, the lower structure has a first lead 332b and a second lead 334b. In the illustrated embodiment, the second lead 330b of the upper structure 322b is coupled to the first lead 332b of the lower structure 324b.

In this configuration, a reference voltage $V_{ref}$ (or voltage signal) can be applied across the first lead 328b of the upper structure 322b and the second lead 334b of the lower structure 324b. A voltage $V_{out}$ can be measured between the second lead 330b of the upper structure 322b and the first lead 332b of the lower structure 324b.

FIG. 3D depicts a top-down view of the strain-sensitive element 308b of FIG. 3C. As a result of the configuration depicted, the strain-sensitive element 308b can be modeled as a closed loop. As a result of the complete loop, a changing magnetic field ΔB induces a current $i_{ind}$. The magnitude of current entering the node at which the output voltage $V_{out}$ is measured is equal to the magnitude of current exiting that same node. Thus, the induced current $i_{ind}$ does not affect the output voltage $V_{out}$.

Figure 4A:
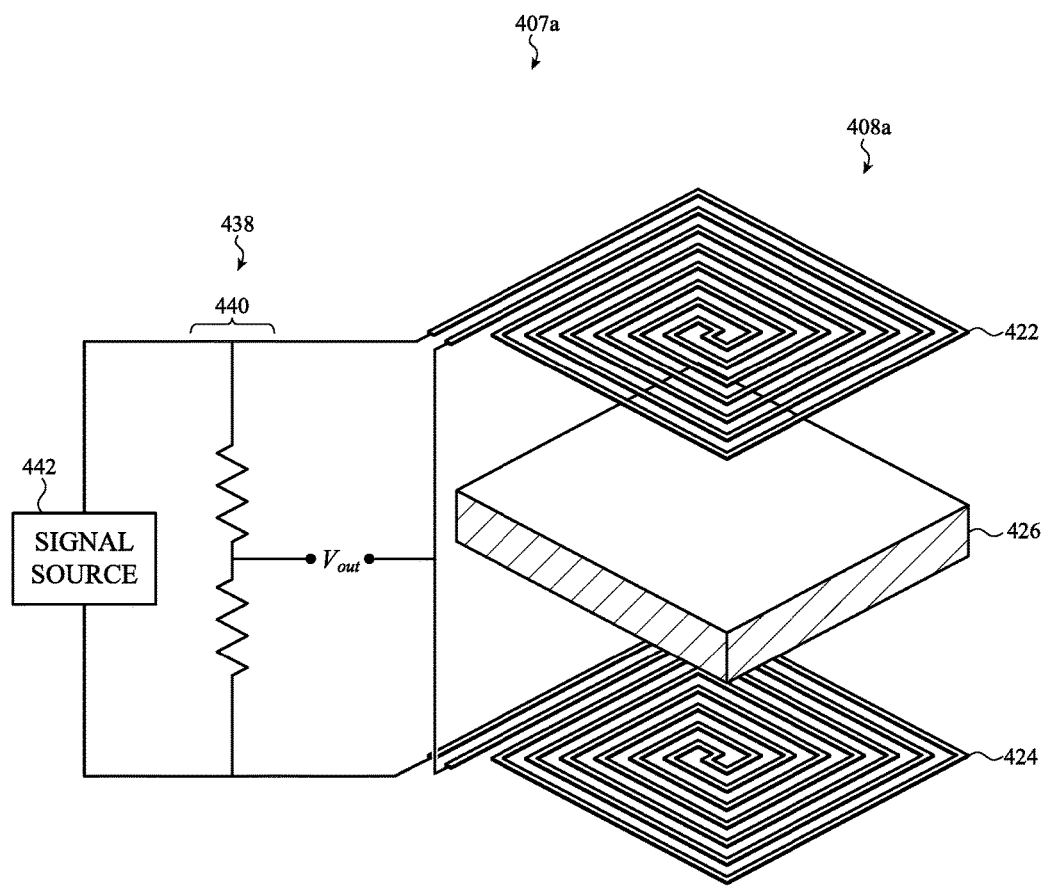
FIG. 4A depicts a strain-responsive sensor including a cross-section of a strain-responsive element including a matched-pair of resistive structures disposed on opposite sides of a substrate.
Figure 4B:
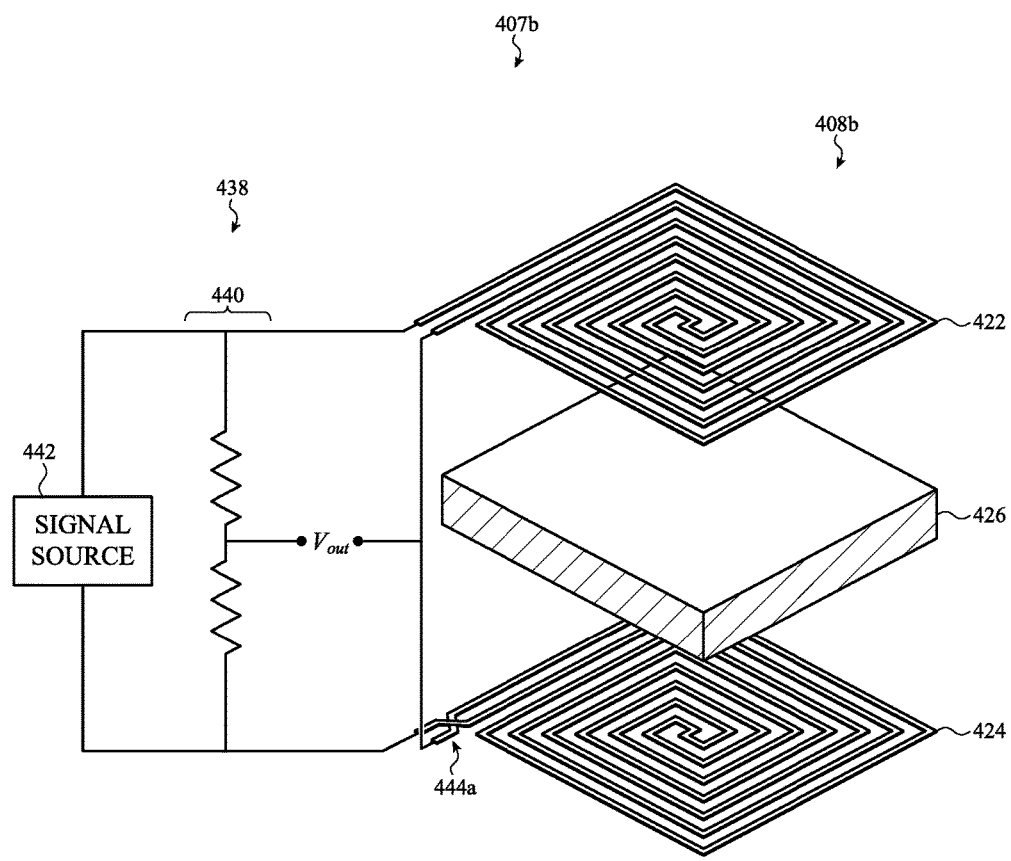
FIG. 4B depicts the strain-responsive sensor of FIG. 3A, specifically showing a physical crossover that reverses current through one of two resistive structures.
Figure 4C:
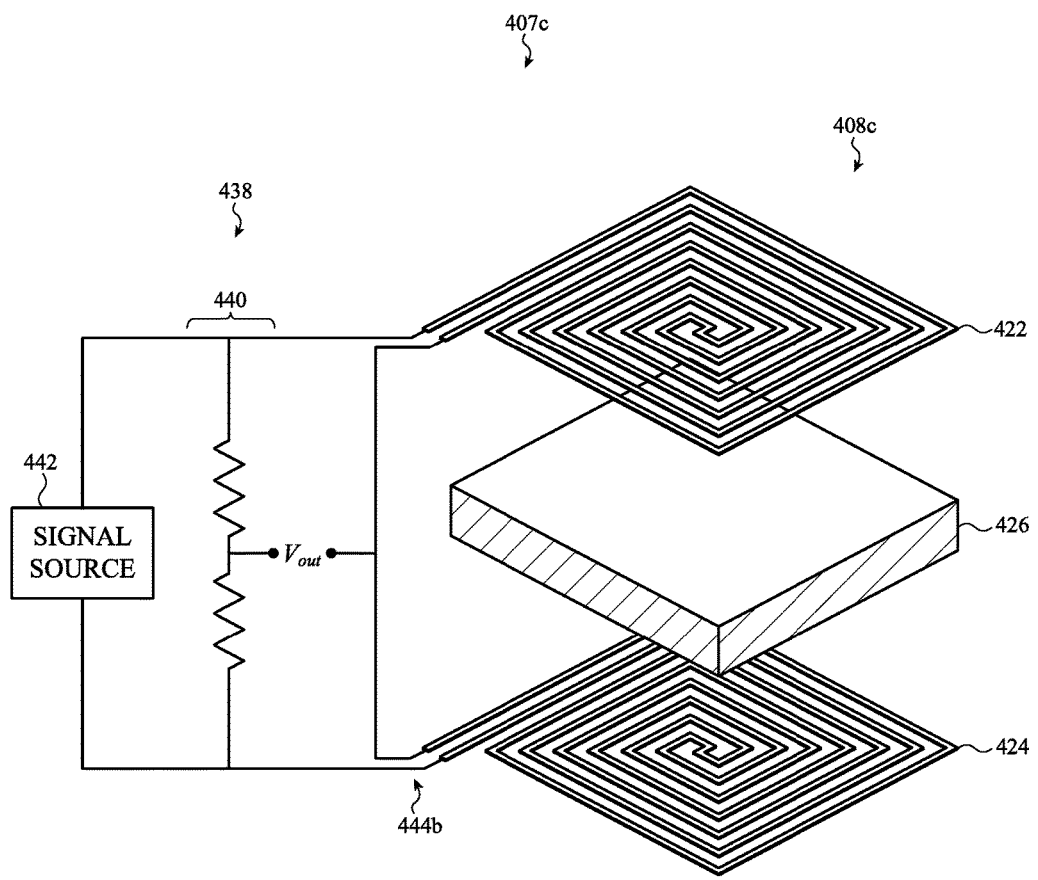
FIG. 4C depicts the strain-responsive sensor of FIG. 3A, specifically showing a soft crossover that reverses current through one of two resistive structures.

It may be appreciated that the simplified examples presented in FIGS. 3A-3D are provided only to illustrate the differences in topologies and configurations that may be susceptible or not susceptible to changing magnetic fields. In other words, it is appreciated that a strain-sensitive element may take any number of shapes beyond that of the circular loops depicted. For example, generally and broadly, FIGS. 4A-4C depict a strain-responsive sensor 407a-407c including a strain-sensitive element 408a-408c defined by a matched-pair of resistive structures 422, 424 electrically coupled into a balancing network configuration. The strain-responsive sensor 407a-407c can be used by an electronic device, such as the electronic device 100 in FIG. 1, to gather pressure or force input from a user of the electronic device. More specifically, the strain-responsive sensor 407a-407c may flex in response to a force input applied by a user to an input surface of an electronic device. Flexure of the input surface causes the strain-sensitive element 408a-408c to experience tension and/or compression which changes the resistance of each resistive structure 422, 424 of the matched-pair.

In operation, a measurement of one or more electrical properties or outputs of the balancing network is obtained. The measurement can be used to resolve a value of the resistance of each resistive structure 422, 424. The resistances of the resistive structures 422, 424 can be used to resolve a value corresponding to tension and/or compression experienced by the strain-sensitive element 408a-408c. This value can thereafter be used to resolve a magnitude, location, and/or movement path of the force input applied by a user to the input surface. The magnitude, location and/or movement path may be used by the electronic device to perform an operation for the user in response to the force input.

A resistive structure, such as either or both of the resistive structures 422, 424, can be formed from any number of suitable materials that exhibit a change in resistance when strained. Such materials include, but are not limited to: copper-nickel alloys, copper-nickel-iron alloys, copper-nickel-mangenese-iron alloys, copper-nickel-mangenese alloys, nickel-chrome alloys, chromium nitride, composite nanowire structures, composite carbon structures, graphene, nanotubes, constantan, karma, silicon, polysilicon, gallium alloys, isoelastic alloys, and so on. In some embodiments, a resistive structure may be optically transparent. In these cases, the resistive structure may be formed from a material such as, but not limited to: indium-tin oxide, carbon nanotubes, metal nanowires, or any combination thereof. In many case, the resistive structure is formed from a material having a known or determinable gauge factor. In many cases, the gauge factor may be greater than 1.0.

In some cases, the strain-responsive sensor 407a-407c includes more than one strain-sensitive element 408a-408c. The multiple strain-sensitive elements 408a-408c may be arranged in any suitable pattern including, but not limited to: an array or grid pattern, a circular pattern, a hub-and-spoke pattern, or any other suitable pattern. The multiple strain-sensitive elements may each take the same size and shape although this is not required. The strain-sensitive elements may be disposed onto the same substrate, or may be disposed onto multiple substrates.

In further embodiments, a single electronic device (e.g., the electronic device 100 as shown in FIG. 1) may include more than one strain-responsive sensor 407a-407c. For example, a strain-responsive sensor 407a-407c including a single strain-sensitive element 408a-408c may be associated with a button of an electronic device whereas another strain-responsive sensor 407a-407c including multiple strain-sensitive elements 408a-408c may be associated with a display of the same electronic device. Accordingly, it may be appreciated that, generally and broadly, an electronic device may incorporate any number of strain-responsive sensors, such as described herein, in any number of suitable and implementation-specific manners.

With specific reference to FIG. 4A, there is shown a portion of a strain-responsive sensor 407a, specifically depicting a strain-sensitive element 408a that is defined by a matched-pair of resistive structures disposed on opposite sides of a substrate. In the illustrated embodiment, the matched-pair of resistive structures includes an upper structure 422 and a lower structure 424 coupled to opposite sides of a substrate 426.

The strain-sensitive element 408a is illustrated in an exploded view. In an implementation of the illustrated embodiment, the upper structure 422 and the lower structure 424 are disposed onto opposite faces of the substrate 426 using a suitable disposition technique such as described above with respect to FIG. 2. The substrate 426 is configured to flex in a free, controlled, or limited manner. For example, the substrate 426 may be supported along its perimeter by a chassis or frame. The substrate 426 may be single layer or stratiform and may have any suitable thickness. In many embodiments, the substrate 426 is less than 1 mm thick. In further embodiments, the substrate 426 may be several microns thick. It is appreciated that the embodiment depicted is not drawn to scale.

The substrate 426 can be transparent, translucent, or opaque. Typically the substrate 404 is electrically insulating, although this may not be required of all embodiments. The substrate 426 may be a multi-purpose element. For example, the substrate 426 may also function as an optical reflector and/or as an electromagnetic or capacitive shield. The substrate 426 may be partially or entirely electrically isolated, biased to a specific voltage, floating, or grounded.

In some cases, the strain-responsive sensor 407a can include more than one strain-sensitive element, such as shown in FIG. 1. In such an embodiment, different strain-sensitive elements may be made from different materials and/or may have different optical properties. For example, a strain-sensitive element adjacent to a perimeter of an input surface, such as the input surface 106 shown in FIG. 1, may be optically translucent or opaque whereas a strain-sensitive element nearby a geometric center of the input surface may be optically transparent.

The upper structure 422 and the lower structure 424 are aligned with one another and take the same shape. As illustrated, the upper structure 422 is defined by an electrically-conductive trace that has a clockwise rectangular spiral shape that doubles-back upon its path once the center of the rectangular spiral is reached. The lower structure 424 is also defined by an electrically-conductive trace that has a clockwise rectangular spiral shape that doubles-back upon its path once the center of the rectangular spiral is reached. In the illustrated embodiment, the lower structure 424 mirrors the path of the upper structure 422 across the plane of the substrate 426. In other words, at each point along the path of the upper structure 422, the conductive trace of the lower structure 424 is aligned with it along an axis passing perpendicular through the substrate 426. In some cases, an electrically-conductive trace can have another shape that doubles back one or more times from one or more central or non-central locations.

Although the upper structure 422 and the lower structure 424 are shown taking a clockwise-oriented rectangular spiral shape that doubles-back, such a configuration is merely an example, and other shapes and circuit trace paths are contemplated.

The upper structure 422 and the lower structure 424 are coupled to an electrical circuit 438. The electrical circuit 438 can be implemented in any number of suitable ways; one simplified example schematic is depicted. The electrical circuit 438 as illustrated includes two reference resistors 440 connected in series. The two reference resistors 440 have a known resistance and are coupled to the upper structure 422 and the lower structure 424 in a balancing network configuration, such as a Wheatstone bridge configuration.

The two reference resistors 440 may be independent high-precision resistors, or may be formed as an array or network of independent resistors. In some cases, the two reference resistors 440 may be variable; the resistance of the two reference resistors 440 may be changed and/or adjusted dynamically.

The electrical circuit 438 also includes a signal source 442 which may apply an electrical signal or an electrical bias to the balancing network. The electrical circuit 438 thereafter measures an output voltage $V_{out}$ of the balancing network.

As a result of the matching between the upper structure 422 and the lower structure 424, environmental conditions affect the upper structure 422 and the lower structure 424 in substantially the same manner. In other words, a change in the resistance of the upper structure 422 as a result of an environmental condition may be matched by an equivalent change in the resistance of the lower structure 424. These changes in resistance cancel as a result of the balancing network configuration. Therefore, the known resistances of the two reference resistors 440 can be used with the measured output voltage $V_{out}$ and an approximation of a neutral axis of the substrate 426 to resolve, determine, approximate, or estimate the resistances of one or both of the upper structure 422 and the lower structure 424. In turn, these resistance measurements may be used by an electronic device, or by another component of the electrical circuit 438 not shown in FIG. 4A, to resolve a value of a magnitude of strain experienced by the substrate 426.

As noted above, changing magnetic fields can induce a measurable electromotive force within the upper structure 422 and the lower structure 424. Particularly, a changing magnetic field may induce a measureable voltage across the leads of both the upper structure 422 and the lower structure 424. As a result of the configuration shown, in which current i flows through the upper structure 422 and the lower structure 424 in opposite directions, the measureable voltage that results from the induced electromotive force may affect the output voltage $V_{out}$. In other words, the depicted topology is similar to the open-loop topology shown in FIG. 3A.

In some embodiments, the upper structure 422 and the lower structure 424 can be positioned a certain minimum distance away from elements within an electronic device that may generate such fields. This may minimize the effect that fields generated by such devices have on the strain-sensitive element 408a.

For example, the strain-sensitive element 408a may be positioned away from an element such as a speaker, a microphone, a haptic feedback component, a magnetic coupling, and so on. In other cases, the output voltage $V_{out}$ may be filtered or adjusted based on whether an element that can generate a changing magnetic field is in operation. For example, the output voltage $V_{out}$ may be filtered based on an audio signal simultaneously output from a speaker element nearby the strain-sensitive element 408a. The implementation of such a filter may vary from embodiment to embodiment.

In other cases, especially for electronic devices having a small form factor, it may not be possible to position the strain-sensitive element 408a a sufficient distance away from changing magnetic field sources. Accordingly, other embodiments described herein include a construction or implementation that causes current i to flow in the same direction through the upper structure 422 and the lower structure 424. With this topology, current may be induced by nearby changing magnetic fields instead of voltage.

For example, FIGS. 4B-4C each depict a strain-sensitive element 408b, 408c that can be positioned adjacent to a changing magnetic field source. These strain-sensitive elements include at least one of a physical crossover or a soft crossover that reverses the current direction through one resistive structure of a matched-pair of resistive structures such that the current direction through each resistive structure is the same.

For example, FIG. 4B depicts a portion of a strain-responsive sensor 407b, specifically showing a strain-sensitive element 408b that is defined by a matched-pair of resistive structures disposed on opposite sides of a substrate. In the illustrated embodiment, the matched-pair of resistive structures includes an upper structure 422, a lower structure 424, and a substrate 426. In this embodiment, two leads of the lower structure 424 are twisted at a crossover 444a. As a result of the crossover 444a, current flows through the lower structure 424 in the same direction as the upper structure 422. This configuration may be generally referred to as a "physical crossover." A physical crossover can be implemented in any suitable manner including, but not limited to: layered traces, vias, jumpers, and so on.

In another example, FIG. 4C depicts a portion of a strain-responsive sensor 407c, specifically showing a strain-sensitive element 408c that is defined by a matched-pair of resistive structures disposed on opposite sides of a substrate. In the illustrated embodiment, the matched-pair of resistive structures includes an upper structure 422, a lower structure 424, and a substrate 426. In this embodiment, two leads that couple the electrical circuit 438 to the lower structure 424 are crossed at a crossover 444b. In some examples, the crossover 444b can be implemented via a software-controlled switch, a hardware-controlled switch, or any other suitable manner. As a result of the crossover 444b, current flows through the lower structure 424 in the same direction as the upper structure 422. This configuration may be generally referred to as a "soft crossover." As with the physical crossover described above with reference to FIG. 4B, a soft crossover can be implemented in any suitable manner.

It may be appreciated that the foregoing description of the crossover embodiments depicted in FIGS. 4B and 4C, and various alternatives thereof and variations thereto are presented, generally, for purposes of explanation, and to facilitate a thorough understanding of various possible configurations of a strain-responsive sensor as contemplated herein. However, it will be apparent to one skilled in the art that some of the specific details presented herein may not be required in order to practice a particular described embodiment, or an equivalent thereof. For example, although many embodiments are described with reference to a matched-pair of resistive sensors, matching may not be required of all embodiments.

For example, in devices in which the strain-sensitive element 408, 408c is positioned near an interfering magnetic field source (e.g., a speaker), the upper structure 422 may experience a different magnetic field effect from the lower structure 424. The upper structure 422 may in such cases have a geometry that does not mirror the lower structure 424. For example, a conductive trace within the upper structure 422 may be differently positioned than a corresponding conductive trace within the lower support structure 424 as depicted in FIGS. 7A-8.

Thus, the foregoing and following descriptions and specific embodiments are understood to be presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings. Particularly, it may be understood that strain-sensitive elements 408b, 408c depicted in FIGS. 4B and 4C can be implemented in a number of suitable ways.

For example, a physical crossover or a soft crossover can be associated with an upper structure instead of a lower structure. In some cases, a strain-responsive sensor can include multiple strain-sensitive elements which each can be implemented in different ways. More specifically, some strain-sensitive elements may include crossovers in upper structures whereas others include crossovers in lower structures. In some cases, physical crossovers may be used with soft crossovers.

FIG. 5 depicts an electronic device 500 that can include a strain-responsive sensor with an array of strain-sensitive elements. Some of the strain-sensitive elements 508 may be positioned near one or more magnetic interference sources 546. The electronic device 500 includes a housing 502 to retain, support, and/or enclose various components of the electronic device 500, such as a display 504. In many embodiments, a protective outer layer of the display 504 defines an input surface 506.

As noted above, the electronic device 500 can also include a strain-responsive sensor coupled to the display 504. The strain-responsive sensor can include an array of strain-sensitive elements 508 distributed in a pattern below the input surface 506. Each strain-sensitive element 508 may include a matched-pair of resistive structures, such as described with respect to FIGS. 2-4C and 6-8.

The electronic device 500 can also include a processor, memory, power supply and/or battery, network connections, sensors, input/output ports, acoustic elements, haptic elements, digital and/or analog circuits for performing and/or coordinating tasks of the electronic device 500, and so on. One or more of these components may be a magnetic interference source 546. For example, a magnetic interference source 546 may be a speaker which may generate magnetic interference.

A magnetic interference source 646 may generate magnetic interference, such as depicted in FIG. 6. Specifically, FIG. 6 depicts a simplified model of a strain-sensitive element 608. The strain-sensitive element 608 includes an upper structure 622 and a lower structure 624. In many embodiments, the upper structure 622a and the lower structure 624a are resistive structures.

The upper structure 622 and the lower structure 624 are coupled to a substrate 626. In many embodiments, the substrate 626 may be thin (e.g., less than 1 mm thick, including several microns thick). Nevertheless, the substrate 626 may separate the upper structure 622 from the lower structure 624 sufficiently such that curling magnetic flux lines 648 caused by the magnetic interference source 646 may induce a slightly different electromotive force in the upper structure 622 than the lower structure 624. As a result, a voltage may be induced in a coupled electrical circuit (such as the electrical circuit 438 depicted in FIGS. 4A-4C).

The induced voltage caused by the curling magnetic flux of the magnetic interference source 646 may not be compensated for by the closed-loop design described above with respect to FIGS. 3A-4C as the upper structure 622 may experience a magnetic field (e.g., magnetic flux) which varies from the magnetic field experienced by the lower structure 624. The differential magnetic fields may induce a net current in the electrical circuit 438. In one embodiment, this effect may be compensated for and the induced current canceled by constructing a strain-sensitive element 608 in which the upper structure 622 does not precisely mirror the lower structure 622, such as described below with respect to FIGS. 7A-8.

Figure 7B:
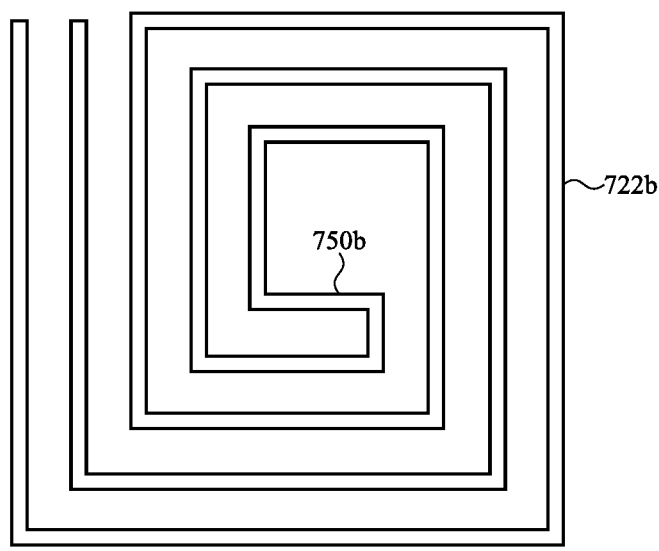
FIG. 7B depicts a second example resistive structure having a second loop area.
Figure 8:
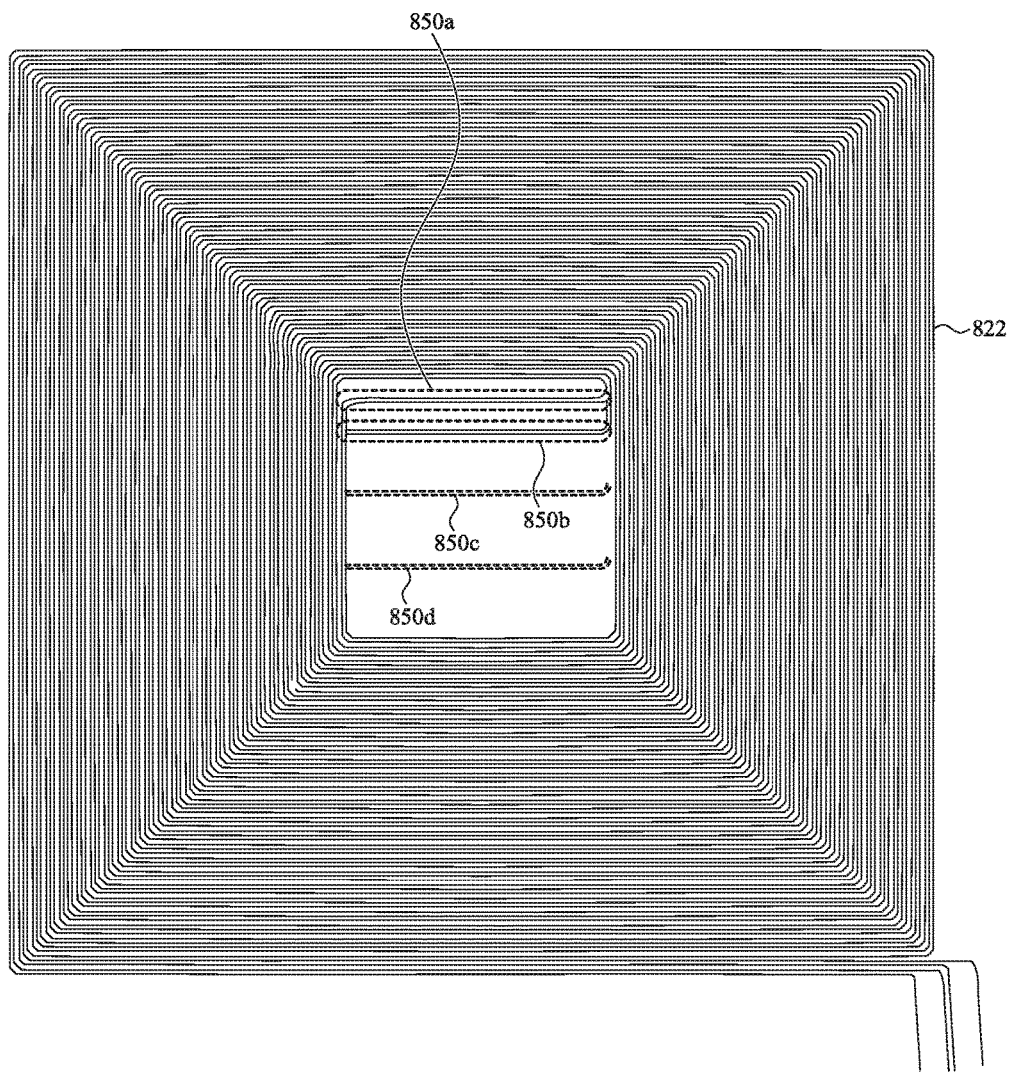
FIG. 8 depicts an example schematic of a resistive structure, illustrating multiple loop areas.

FIGS. 7A and 7B depict example resistive structures 722a, 722b which do not precisely mirror each other. In some examples, the resistive structure 722a depicted in FIG. 7A may be coupled to a top surface of a substrate to form an upper structure. The resistive structure 722b depicted in FIG. 7B may be coupled to a bottom surface of the substrate to form a lower structure. Thus the resistive structures 722a, 722b may be a matched-pair forming a strain-sensitive element, similar to the strain-sensitive elements 408a, 408b, 408c, 608 described above with respect to FIGS. 4A-4C and 6.

In other examples, the resistive structure 722a depicted in FIG. 7A may be coupled to a bottom surface of a substrate to form a lower structure. The resistive structure 722b depicted in FIG. 7B may be coupled to a top surface of the substrate to form an upper structure, which may also form a strain-sensitive element.

The response of a matched pair of resistive structures 722a, 722b to a magnetic field may vary according to physical parameters of the resistive structures 722a, 722b. For example, if the area of a first resistive structure 722a is different from a second, matching resistive structure 722b, the response of the pair of resistive structures 722a, 722b to a magnetic field may be different. Similarly, the response to a magnetic field may be changed by moving the resistive structures 722a, 722b so that the conductive traces do not align. Whether changing the geometry of the resistive structures 722a, 722b or their alignment, the magnetic flux experienced by each is made equal (or nearly equal), so that any response to the magnetic field is canceled.

In an example, the resistive structures 722a, 722b depicted in FIGS. 7A and 7B may be mostly aligned with one another and take nearly the same shape. As illustrated, a first resistive structure 722a (e.g., an upper structure) is defined by an electrically-conductive trace that has a counter-clockwise rectangular spiral shape that doubles-back upon its path at a central trace line 750a once the center of the rectangular spiral is reached. A second resistive structure 722b (e.g., a lower structure) is also defined by an electrically-conductive trace that has a counter-clockwise rectangular spiral shape that doubles-back upon its path at a central trace line 750b once the center of the rectangular spiral is reached.

In the illustrated embodiment, the central trace line 750b of the second resistive structure 722b is in a different location than the central trace line 750a of the first resistive structure 722a. In other words, while most of the conductive traces of the first resistive structure 722a and the second resistive structure 722b are aligned along an axis passing perpendicular through a substrate at any given point, the central trace 750a of the first resistive structure 722a is not aligned with the central trace 750b of the second resistive structure 722b along such an axis. Thus the second resistive structure 722b does not precisely mirror the path of the first resistive structure 722a across the plane of a substrate. When the matched-pair of resistive structures 722a, 722b experience slightly varying magnetic fields, this different geometry may cancel the effect of the magnetic fields.

Although the resistive structures 722a, 722b are shown taking a clockwise-oriented rectangular spiral shape that doubles-back, such a configuration is merely an example, and other shapes and circuit trace paths are contemplated. In some examples a different portion of the conductive trace may be moved or changed, such as at a side of the resistive structure 722a, 722b.

Thus, the foregoing and following descriptions and specific embodiments are understood to be presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings. Particularly, it may be understood that the resistive structures 722a, 722b depicted in FIGS. 7A and 7B can be implemented in a number of suitable ways.

For example, as depicted in FIG. 8, a resistive structure 822 may be designed with multiple potential shapes to "tune" the response of a matched pair or resistive structures 822 to a known magnetic interference source. A resistive structure 822 may be tuned to cancel magnetic field interference by changing its area, such as by altering the location and/or length of the central trace line 850a-850d.

FIG. 8 depicts a schematic representation of a resistive structure 822, illustrating variations of a central trace line 850a-850d. Resistive structures 822 based on FIG. 8 are defined by an electrically-conductive trace that has a clockwise rectangular spiral shape that doubles-back upon its path at one of several central trace lines 850a-850d once the center of the rectangular spiral is reached.

A matched-pair of resistive structures forming a strain-sensitive element may include a first resistive structure 822 with a first central trace line 850a and a second resistive structure 822 with a second central trace line 850b. Because the matched-pair of resistive structures 822 have conductive paths that do not precisely mirror one another, the effect of slightly varying magnetic fields may be canceled.

Various factors may affect the tuning of a resistive structure 822 to appropriately cancel different magnetic fields. For example, the tuning may be affected by proximity of a strain-sensitive element to a magnetic interference source, the strength of the fields of different magnetic interference sources, and so on. Thus while a first resistive structure 822 in a matched-pair may generally have a first central trace line 850a, the second resistive structure 822 may have a second central trace line 850b, a third central trace line 850c, and so on to tune the matched-pair to expected interference.

In many embodiments, each resistive structure 822 in an array of strain-sensitive elements may be formed with a single central trace line 850a-850d selected from several options prior to fabrication. Thus the schematic representation of FIG. 8 illustrates several mutually-exclusive central trace lines 850a-850d, only one of which will be included in a fabricated resistive structure 822.

However, in some embodiments more than one central trace line 850a-850d may be formed in a first part of a fabrication process. In a second part of a fabrication process, a central trace line 850a-850d may be selected and the remaining central trace lines 850a-850d may be partially or entirely obliterated to prevent short circuits. For example, in a first part of a fabrication process an array of resistive structures 822 may be formed on a film or other substrate. Subsequently, the film may be cut to form a subset of resistive structures 822 for a particular electronic device, and central trace lines 850a-850d may be selectively partially or entirely obliterated in order to leave each resistive structure 822 with a single central trace line 850a-850d based on factors such as its proximity to a magnetic interference source.

FIGS. 9A and 9B depict examples of arrays of resistive structures which may form a strain-responsive sensor. FIG. 9A depicts an example of an array 909a of upper resistive structures 922. FIG. 9B depicts an example of an array 909b of lower resistive structures 924. The array of upper structures 922 of FIG. 9A and the array of lower structures 924 of FIG. 9B may form matched-pairs of lower resistive structures 924 and upper resistive structures 922 in an array of strain-sensitive elements of a strain-responsive sensor.

Specifically, FIG. 9A depicts a simplified model of an array 909a of upper structures 922. In many embodiments, the upper structures 922 are resistive structures configured to detect, measure, and/or estimate a force applied to an input surface of an electronic device. The upper structures 922 may be coupled to conductive leads 928, which may provide signals to electrical circuitry (e.g., electrical circuit 438, depicted in FIGS. 4A-4C) and/or a processing unit.

Similarly, FIG. 9B depicts an array 909b of lower structures 924 configured to form matched-pairs with the array 909a of upper structures 922. Each lower structure 922 may similarly be coupled to a conductive lead. Though not illustrated in FIGS. 9A and 9B, a lead 928 of each upper structure 922 is coupled to a lead 924 of a corresponding lower structure 924.

In some embodiments, the array 909a of upper structures 922 and conductive leads 928 may be deposited on a top surface of a substrate (e.g. substrate layer 226 depicted in FIG. 2). The array 909b of lower structures 924 may be deposited on a bottom surface of the same substrate, in a manner such as describe with respect to FIG. 2. In some embodiments, each of the array 909a of upper structures 922 and the array 909b of lower structures 924 may be formed on a film or other substrate, which films are then coupled to a common substrate (e.g., by an adhesive).

Generally, a matched-pair resistive structures 922, 924 includes an upper structure 922 and a lower structure 924 which mirrors the upper structure 922. However, some of the matched-pairs of upper structures 922 and lower structures 924 may be positioned near a magnetic interference source, such as a speaker. In these examples, the lower structure 924 may not mirror its matching upper structure 922. Instead, the matched-pair may be tuned, such as by changing a central trace line, as described with respect to FIGS. 7A-8.

Turning to FIG. 10, example operations of a method of operating a strain-responsive sensor in a manner that avoids magnetic interference are depicted. The method 1000 can begin at operation 1002 in which a voltage is applied to a resistive structure. At operation 1004, a voltage of the same polarity is applied to a second resistive structure. At operation 1006, a measurement is obtained from a balancing network that is electrically coupled to the first and second resistive structure.

For example, embodiments described herein are not necessarily limited to measuring resistive sensors or strain sensors, and other sensors and other sensor types can be accurately measured using the systems and method described herein. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to that particular embodiment to the exclusion of others.

Additionally, although many embodiments are described herein with respect to match-pairs of resistive structures, it may be understood that such a configuration may not be required for all embodiments or implementations. For example, as noted above, the matched properties of associated resistive structures may assist with noise reduction. However, in some embodiments, a desired degree of noise reduction may not require matching between resistive structures. In these embodiments, different resistive structures can be formed from different materials, may exhibit different resistances, and so on.

One may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
an enclosure housing a display;
a cover sheet positioned over the display and forming an external surface of the electronic device;
a magnetic interference source positioned within the enclosure; and
a strain-sensing layer positioned beneath the cover sheet and comprising:
a substrate comprising an upper surface and a lower surface;
a first strain-sensing element comprising:
a first upper resistive structure comprising a first set of conductive traces and coupled to the upper surface of the substrate; and
a first lower resistive structure comprising a second set of conductive traces aligned along an axis passing perpendicular through the substrate with the first set of conductive traces and coupled to the lower surface of the substrate; and
a second strain-sensing element positioned adjacent the magnetic interference source and comprising:
a second upper resistive structure comprising a third set of conductive traces and coupled to the upper surface of the substrate; and
a second lower resistive structure comprising a fourth set of conductive traces and coupled to the lower surface of the substrate; wherein
at least a portion of the fourth set of conductive traces does not align along the axis with the third set of conductive traces.

2. The electronic device of claim 1, wherein
a first central conductive trace of the third set of conductive traces is not aligned with a second conductive trace of the fourth set of conductive traces; and
remaining traces of the third set of conductive traces are aligned with remaining traces of the fourth set of conductive traces.

3. The electronic device of claim 1, wherein the substrate is formed from at least one of glass, polyimide, or polyethylene terephthalate.

4. The electronic device of claim 1, wherein at least one upper resistive structure has a spiral shape.

5. The electronic device of claim 1, wherein each upper resistive structure is formed from the same material.

6. The electronic device of claim 5, wherein each lower resistive structure is formed from the same material.

7. The electronic device of claim 1, wherein the substrate is coupled to the display.

8. The electronic device of claim 1, wherein the second strain-sensing element further comprises a crossover coupled to the second lower resistive structure such that current within the second lower resistive structure flows in the same direction as current within the second upper resistive structure.

9. The electronic device of claim 1, wherein the first upper resistive structure is formed from at least one of indium tin oxide, a copper-nickel alloy, a copper-nickel-iron allow, or a copper-nickel manganese alloy.

10. The electronic device of claim 1, wherein the first lower resistive structure has a same shape as the first upper resistive structure.

11. The electronic device of claim 8, wherein the crossover is a physical crossover.

12. The electronic device of claim 8, wherein the crossover is a soft crossover.

13. The electronic device of claim 1, wherein the first and second strain-sensing elements are part of a group of strain-sensing elements.

14. The electronic device of claim 1, further comprising:
a first reference resistor; and
a second reference resistor; wherein
the first and second upper resistive structures, the first and second lower resistive structures, the first reference resistor, and the second reference resistor are coupled in a balancing network.

15. The electronic device of claim 14, wherein an electrical circuit is configured to measure a voltage output from the balancing network.

* * * * *